INVENTOR
FRANK T. SMITH,
ROBERT D. SMITH

BY Robert A Lester
AGENT

July 15, 1969     F. T. SMITH ET AL     3,455,146
METHOD AND APPARATUS FOR DETERMINING FILTRABILITY TIME
Filed June 6, 1967     2 Sheets-Sheet 2
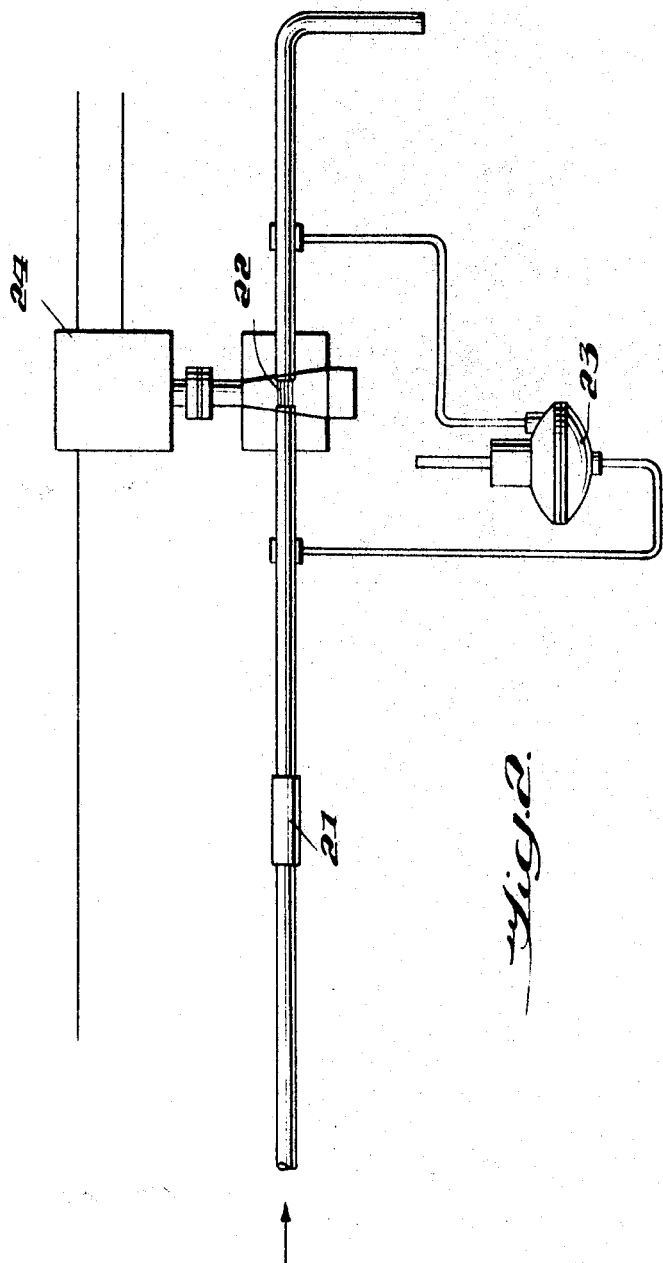
INVENTOR
FRANK T. SMITH,
ROBERT D. SMITH
BY Robert A. Leser
AGENT

United States Patent Office 3,455,146
Patented July 15, 1969

3,455,146
METHOD AND APPARATUS FOR DETERMINING FILTRABILITY TIME
Frank T. Smith and Robert D. Smith, Wilmington, Del., assignors to E. I. du Pont de Nemours and Company, Wilmington, Del., a corporation of Delaware
Filed June 6, 1967, Ser. No. 643,980
Int. Cl. G01n 15/04
U.S. Cl. 73—61.4        10 Claims

ABSTRACT OF THE DISCLOSURE

A method for determining the time in which a device will develop a given pressure drop or flow rate when subjected to a process stream containing a substantial amount of material that does not pass through the device, which comprises:

Figure 1:
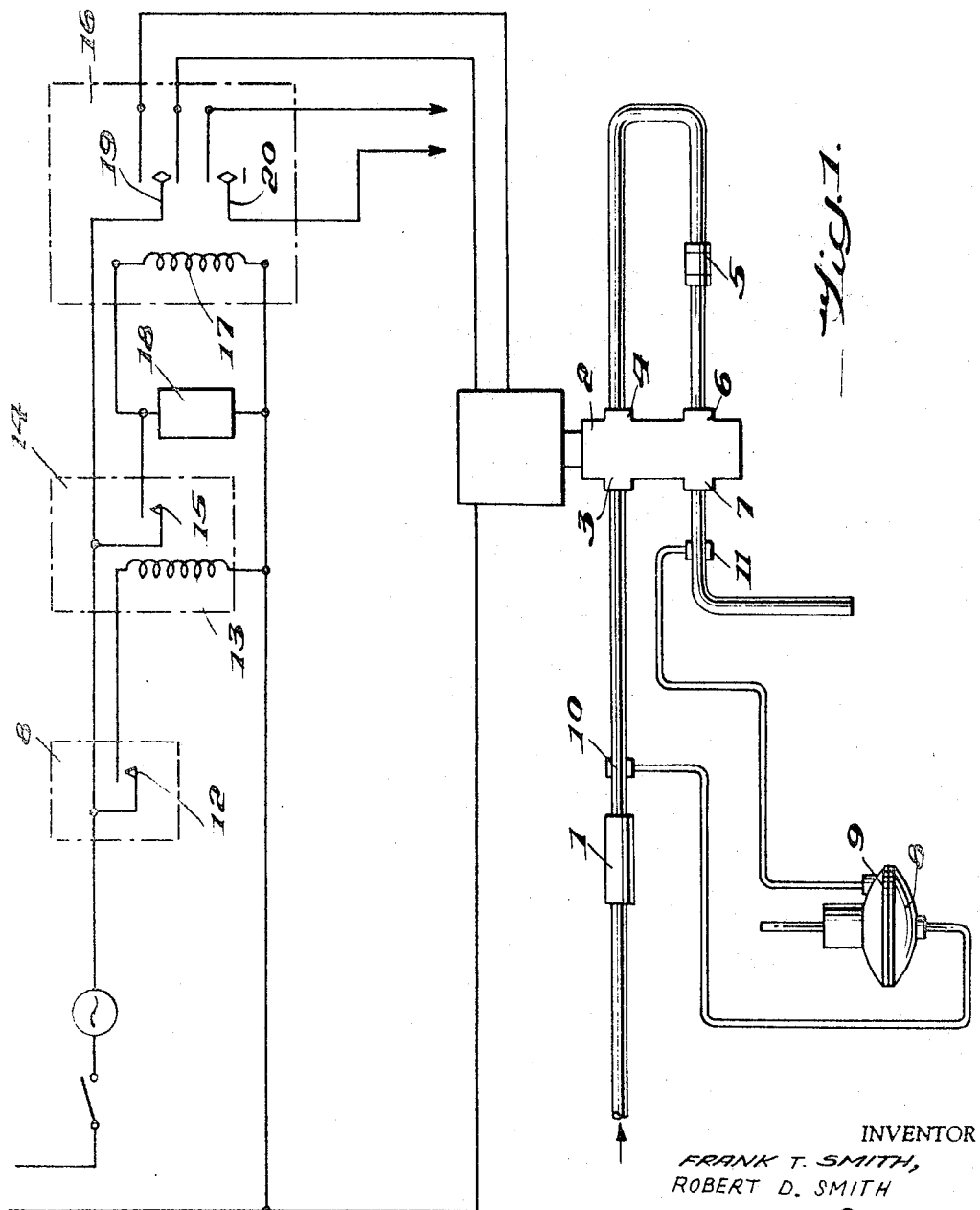

(a) Determining the equivalent number of openings of the device by comparing the device and a strainer when each is subjected to the same test stream, the strainer having a mesh size such that it removes only such size material as would be entrapped by the device, and (b) Thereafter, passing the process stream through the same strainer and correlating the time dependent pressure drop across or flow rate through the strainer to the time in which the device will develop a given pressure drop or flow rate based on the equivalent number of openings of the device.

Under constant flow conditions, the pressure drop across the strainer as a function of time may be continuously determined by reversing the strainer with respect to the process stream flow or vice versa whenever the pressure drop reaches a predetermined value.

Background of the invention

Fouling of apparatus (e.g., heat exchangers, filter beds, etc.) by particles, sludge, debris, slime and other entrained matter hampers the efficient operation of many industrial processes. It is extremely desirable, therefore, to predetermine the time such apparatus can function before a maximum pressure drop and/or minimum flow rate is reached. This determination provides an important factor in considering the type and size of equipment employed, and the feasibility of periodic cleaning and/or installation of solids removal equipment.

Summary of the invention

The present invention is a method for determining the time in which a device will develop a given pressure drop or flow rate when subjected to a process stream containing a substantial amount of material that does not pass through said device, which comprises:

(a) Determining the equivalent number of openings of said device by comparing said device and a strainer when each is subjected to the same test stream, said strainer having a mesh size such that it removes only such size material as would be entrapped by said device, and (b) Thereafter, passing the process stream through said strainer and correlating the time dependent pressure drop across or flow rate through the strainer to the time in which said device will develop a given pressure drop or flow rate based on the equivalent number of openings of said device.

One apparatus which may be used to continuously determine the pressure drop across the strainer as a function of time comprises:

(a) Said strainer, (b) Means for sensing the pressure drop across said strainer, (c) Means for reversing said strainer with respect to the direction of stream flow or vice versa whenever the pressure drop across said strainer reaches a predetermined value, and (d) Means for recording the number of reversals in a given time.

For a more detailed understanding of the invention reference is made to the following description and the attendant drawings wherein:

FIGURE 1 is a schematic diagram of an apparatus which may be used to determine pressure drop as a function of time; and FIGURE 2 is a schematic diagram of an alternative apparatus which employs the same electrical circuitry as the apparatus of FIGURE 1.

Applicants have found that devices e.g., heat exchangers, filter beds, etc.) capabl eof removing solid material from process streams may be characterized as having an effective number of openings, $N_2$, of an effective diameter, $d$. By this characterization, the time for a device to develop a predetermined pressure drop, $\Delta P_4$, or a predetermined flow rate, $W_4$, may be determined by subjecting a strainer having $N_1$ openings of diameter, $d$, to the process stream. The strainer may be either a perforated sheet or a screen having at least 100 openings.

The effective diameter, $d$, is obtained by subjecting the device and various size strainers to a stream containing a substantial amount of material that does not pass through the device and selecting the size strainer which removes only such size material as would be entrapped by the device.

It has further been found that any apparatus, device or strainer, characterized as having openings of a given diameter, which removes solid material from a stream has a modus operandi defined by the following differential equation:

$$\frac{dN}{dt} = -f \cdot K \cdot N \qquad (a)$$

wherein N is the number of openings remaining in the apparatus at time $t$, $f$ is the flow rate through one opening, and K, a constant for any given stream, is the average number of openings plugged per volume of flow through the apparatus.

If the total flow rate, through the apparatus, W, is constant, $f = W/N$ and $dN = -W \cdot K \cdot dt$.

Integrating from $N_0$, the number of openings at $t=0$, to N and from time zero to $t$ the following is obtained:

$$\frac{N}{N_0} = 1 - \left(\frac{W \cdot t \cdot K}{N_0}\right)$$

Since $N/N_0$ equals $\sqrt{\Delta P_0/\Delta P}$, where $\Delta P_0$ and $\Delta P$ are the pressure drops across the apparatus at time zero and $t$, respectively, $$K = \frac{N_0(1 - \sqrt{\Delta P_0/\Delta P})}{W \cdot t} \qquad (b)$$

If the pressure drop, $\Delta P$, across the apparatus is constant, $f$ is a constant. By integrating Equation a between the same limits as before, $$\frac{N}{N_0} = e^{+f \cdot K \cdot t}$$

Since $N/N_0$ equals $W/W_0$ where $W_0$ is the total flow rate at time zero and $f = W_0/N_0$, $$K = \frac{N_0}{W_0 t} \cdot \ln\left(\frac{W_0}{W}\right) \qquad (c)$$

To illustrate the invention, the subsequent description will be limited to constant flow, incorporating only Equation $b$.

Both the aforementioned strainer and device are subjected to a test stream, containing a substantial amount of material that does not pass through either, for time periods $t_1$ and $t_2$ and at flow rates $W_1$ and $W_2$, respectively. The device and strainer may be placed in parallel or subjected to the test stream sequentially. The pressure drops across the device and the strainer at the start, $\Delta P_{01}$ and $\Delta P_{02}$, respectively, and the pressure drops after the time periods $t_1$ and $t_2$, $\Delta P_1$ and $\Delta P_2$, respectively, are measured.

By using Equation b for the strainer and the device, substituting the appropriate values and equating both, $N_2$, the effective number of holes of the device may be determined by:

$$N_2 = \frac{N_1 \cdot (1 - \sqrt{\Delta P_{01}/\Delta P_1}) \cdot W_2 \cdot t_2}{W \cdot t \cdot (1 - \sqrt{\Delta P_{02}/\Delta P_2})} \quad (d)$$

Thereafter, the process stream is passed through the same strainer at a flow rate $W_3$ for a time period $t_3$. The pressure drops at the start and after time period $t_3$, $\Delta P_{03}$ and $\Delta P_3$, respectively, are measured. The time, $t_4$, in which the device will develop a pressure drop, $\Delta P_4$, from a given pressure drop, $\Delta P_{04}$, when subjected to the process stream flowing at a rate, $W_4$, is then determined by substituting the aforementioned values into Equation b for both the strainer and the device and equating both whereby the following equation is obtained:

$$t_4 = \frac{N_2 \cdot (1 - \sqrt{\Delta P_{04}/\Delta P_4}) \cdot W_3 \cdot t_3}{W_4 \cdot N_1 \cdot (1 - \sqrt{\Delta P_{03}/\Delta P_3})} \quad (e)$$

The pressure drop, $\Delta P_{04}$, is preferably predetermined either experimentally by calibrating clean screen flow rate v. pressure drop or empirically. The pressure drop, $\Delta P_4$ is a function of the particular process depending upon a balance of factors, e.g., pump head, heat transfer, cost, yield, etc.

This determination, commonly coined "the fouling cycle of the device," provides an important factor in considering the type and size of equipment employed, and the feasibility of periodic cleaning and/or installation of solids removal equipment. Thus, by characterizing a particular device as having $N_2$ openings of diameter $d$, the fouling cycle may be determined without passing the process stream through the device.

By operating entirely at constant pressure drop across both the device and strainer, the time $t_4$ would be determined by the exclusive use of Equation c. A combination of constant flow rate and constant pressure drop conditions may be used. For example, the strainer could be operated at a constant flow rate and the device, at a constant pressure drop. By letting $X_1 = _{1,2,3,4}$ equal either $1 - \sqrt{\Delta P_{01}/\Delta P_1}$ at constant flow rate or in $(W_{01}/W_1)$ at constant pressure drop and equating Equations b and c the effective number of openings, $N_2$, is generically represented by $$\frac{N_1 \cdot X_1 \cdot W_2 \cdot t_2}{W_1 \cdot t_1 \cdot X_2} \quad (f)$$

and $$t_4 = \frac{N_2 \cdot X_4 \cdot W_3 \cdot t_3}{W_4 \cdot N_1 \cdot X_3} \quad (g)$$

Also, if the steps in the above method are operated such that the flow rate otherwise has a fixed and determinable relationship to the pressure drop, Equation a may be appropriately integrated. This has general application where the process stream has neither a fixed pressure drop nor flow rate.

The apparatus shown in FIGURE 1 may be used with constant flow rate to obtain continuous values of $\Delta P_3 v \cdot t_3$ for Equation e.

The process stream enters from the left passing through constant flow orifice 1 (the flow rate is $W_3$). The stream then passes through the four-way motor valve 2. On one cycle the stream enters through port 3, exits through port 4, passes through strainer 5, re-enters through port 6 and finally exits through port 7 to drain. When the pressure drop across strainer 5, as sensed by differential pressure switch 8, reaches a given value, valve 2 is reversed. The flow path is then via ports 3 and 6, strainer 5, and ports 4 and 7. When the pressure drop reaches the same value again, valve 2 reverses and the original flow path is re-established. For clarity valve 2 is illustrated with the ports lying in different planes. However, in practice, all ports extend radially in the same plane. This provides a minimum, equal pressure drop across the valve for both flow paths.

The following electrical circuit is only representative of a number of circuits which may be used in conjunction with the present invention.

Diaphragm 9 within switch 8 moves in response to the pressure drop between points 10 and 11. When the given pressure drop is reached, diaphragm 9 trips a microswitch closing contact 12 thereby allowing the 117 volt, 60 cycle supply current to pass into coil 13 of time delay relay 14.

This relay introduces a five second time lag between the time the current enters coil 13 and the time contact 15 closes. Therefore only a sustained signal will cause contact 15 to close. Otherwise a spurious line signal would activate the subsequent reversing relay 16. When contact 15 closes the signal is passed to coil 17 of reversing relay 16.

Counter 18, connected in parallel between time delay relay 14 and reversing relay 16, indicates the number of times contact 15 closes.

When the signal enters coil 17, contact 19 changes position. Thus, if contact 19 is in the lower position when contact 15 closes, it moves to the upper position until the next signal is received. When contact 19 contacts the upper position, four-way motor valve 2 is actuated allowing the process stream to flow through one of the aforementioned paths. When contact 19 switches, the other path is open to flow.

If desired, each signal may be additionally recorded by providing a contact 20 which is mechanically linked to contact 19. By connecting in series, a power supply and a recorder, the signal can be recorded when contact 20 is in the upper position.

Each time the stream flow is reversed, the entrained material on the surface of strainer 5 is backflushed to drain. This allows each cycle to start at the same initial pressure drop, $\Delta P_{03}$.

An alternative apparatus is shown in FIGURE 2. The same electrical circuit as illustrated in FIGURE 1 is used. Instead of reversing the flow path, the strainer is reversed. Thus the entering process stream passes through constant flow orifice 21 and strainer 22 to drain. When the given pressure drop, as sensed by differential pressure switch 23, is reached, reversal motor 24 rotates the strainer 180°; the strainer is back flushed; and the reversal is recorded as before.

It will be understood that various changes in the details, materials, steps, order of steps, etc., which have been herein described and illustrated in order to explain the nature of the invention, may be made by those skilled in the art within the principle and scope of the invention.

We claim:

1. A method for predetermining the time, $t_4$, in which a device will develop a pressure drop, $\Delta P_4$, from a given starting pressure drop, $\Delta P_{04}$, when subjected to a process stream flowing at a rate $W_4$, the process stream containing a substantial amount of material that does not pass through said device, which comprises:

(a) determining the equivalent number of openings of said device, $N_2$, by subjecting to the same test stream said device and a strainer, said strainer having an opening size such that it removes only such size material as would be entrapped by said device, for time periods $t_1$ and $t_2$ and at flow rates $W_1$ and $W_2$, respectively, said strainer having $N_1$ openings, $N_1$ being at least 100, measuring the pressure drops across said device and said strainer at the start, $\Delta P_{01}$ and $\Delta P_{02}$, and the pressure drops after the time periods $t_1$ and $t_2$, $\Delta P_1$ and $\Delta P_2$, respectively, and determining $N_2$, $N_2$ being equal to $$\frac{N_1 \cdot \left(1-\sqrt{\frac{\Delta P_{01}}{\Delta P_1}}\right) \cdot W_2 \cdot t_2}{W_1 \cdot t_1 \cdot \left(1-\sqrt{\frac{\Delta P_{02}}{\Delta P_2}}\right)}$$

(b) thereafter, passing the process stream through the same strainer at a flow rate $W_3$ for a time period $t_3$ and measuring the pressure drop at the start, $\Delta P_{03}$, and the pressure drop after the time period $t_3$, $\Delta P_3$, and determining the time $t_4$, said time being equal to $$\frac{N_2 \cdot \left(1-\sqrt{\frac{\Delta P_{04}}{\Delta P_4}}\right) \cdot W_3 \cdot t_3}{W_4 \cdot N_1 \cdot \left(1-\sqrt{\frac{\Delta P_{03}}{\Delta P_3}}\right)}$$

2. The method of claim 1 wherein said device is a heat exchanger.

3. The method of claim 1 wherein said device is a filter bed.

4. The method of claim 1 wherein said strainer in said process stream is reversed whenever the pressure drop reaches a predetermined pressure drop $\Delta P_3$.

5. The method of claim 1 wherein the direction of flow of said process stream through said strainer is reversed whenever the pressure drop reaches a predetermined pressure drop $\Delta P_3$.

6. A method for predetermining the time, $t_4$, in which the flow rate through a device falls to $W_4$ from a given starting flow rate, $W_{04}$, when said device is subjected to a process stream flowing therethrough, the process stream containing a substantial amount of material that would be entrapped by said device, the flow of said process stream being obtained by maintaining a constant pressure drop across said device, which comprises:

(a) determining the equivalent number of openings of said device, $N_2$, by subjecting to the same test stream said device and a strainer, said strainer having an opening size such that it removes only such size material as would be entrapped by said device, for time periods $t_1$ and $t_2$, and at constant pressure drops across said device and said strainer, said strainer having $N_1$ openings, $N_1$ being at least 100, measuring the flow rates through said device and said strainer at the start, $W_{01}$ and $W_{02}$, and the flow rates after time periods $t_1$ and $t_2$, $W_1$ and $W_2$, respectively, and determining $N_2$, $N_2$ being equal to $$\frac{N_1 \cdot \ln\left(\frac{W_{04}}{W_1}\right) \cdot W_2 \cdot t_2}{W_1 \cdot t_1 \cdot \ln\left(\frac{W_{03}}{W_3}\right)}$$

(b) thereafter, passing the process stream through same strainer at a constant pressure drop across said strainer for a time period, $t_3$, and measuring the flow rate at the start, $W_{03}$, and the flow rate after the time period $t_3$, $W_3$, and determining the time, $t_4$, said time being equal to $$\frac{N_2 \cdot \ln\left(\frac{W_{04}}{W_4}\right) \cdot W_3 \cdot t_3}{W_4 \cdot N_1 \cdot \ln\left(\frac{W_{03}}{W_3}\right)}$$

7. A method for predetermining the time, $t_4$, in which the flow rate through a device falls to $W_4$ from a given starting flow rate, $W_{04}$, when said device is subjected to a process stream flowing therethrough, the process stream containing a substantial amount of material that would be entrapped by said device, the flow of said process stream being obtained by maintaining a constant pressure drop across said device, which comprises:

(a) determining the equivalent number of openings of said device, $N_2$, by subjecting to the same test stream said device and a strainer, said strainer having an opening size such that it removes only such size material as would be entrapped by said device, for time periods $t_1$ and $t_2$ and at flow rates $W_1$ and $W_2$ respectively, said strainer having $N_1$ openings, $N_1$ being at least 100, measuring the pressure drops across said device and said strainer at the start, $\Delta P_{01}$ and $\Delta P_{02}$, and the pressure drops after the time periods $t_1$ and $t_2$, $\Delta P_1$ and $\Delta P_2$, respectively, and determining $N_2$, $N_2$ being equal to $$\frac{N_1 \cdot \left(1-\sqrt{\frac{\Delta P_{01}}{\Delta P_1}}\right) \cdot W_2 \cdot t_2}{W_1 \cdot t_1 \cdot \left(1-\sqrt{\frac{\Delta P_{02}}{\Delta P_2}}\right)}$$

(b) thereafter, passing the process stream through the same strainer at a constant pressure drop across said strainer for a time period, $t_3$, and measuring the flow rate at the start, $W_{03}$, and the flow rate after the time period $t_3$, $W_3$, and determining the time, $t_4$, said time being equal to $$\frac{N_2 \cdot \ln\left(\frac{W_{04}}{W_4}\right) \cdot W_3 \cdot t_3}{W_4 \cdot N_1 \cdot \ln\left(\frac{W_{03}}{W_3}\right)}$$

8. A method for predetermining the time, $t_4$, in which a device will develop a pressure drop, $\Delta P_4$, from a given starting pressure drop, $\Delta P_{04}$, when subjected to a process stream flowing at a rate $W_4$, the process stream containing a substantial amount of material that would be entrapped by said device, which comprises:

(a) determining the equivalent number of openings of said device, $N_2$, by subjecting to the same test stream said device and a strainer, said strainer having an opening size such that it removes only such size material as would be entrapped by said device, for time periods $t_1$ and $t_2$, at constant pressure drops across said device and said strainer, said strainer having $N_1$ openings, $N_1$ being at least 100, measuring the flow rates through said device and said strainer at the start $W_{01}$ and $W_{02}$ respectively and the flow rates after time periods $t_1$ and $t_2$, $W_1$ and $W_2$, respectively, and determining $N_2$, $N_2$ being equal to $$\frac{N_1 \cdot \ln\left(\frac{W_{01}}{W_1}\right) \cdot W_2 \cdot t_2}{W_1 \cdot t_1 \cdot \ln\left(\frac{W_{02}}{W_2}\right)}$$

(b) thereafter, passing the process stream through the same strainer at a flow rate $W_3$ for a time period $t_3$ and measuring the pressure drop at the start, $\Delta P_{03}$, and the pressure drop after the time period $t_3$, $\Delta P_3$, and determining the time $t_4$, said time being equal to $$\frac{N_2 \cdot \left(1-\sqrt{\frac{\Delta P_{04}}{\Delta P_4}}\right) \cdot W_2 \cdot t_2}{W_4 \cdot N_1 \cdot \left(1-\sqrt{\frac{\Delta P_{03}}{\Delta P_3}}\right)}$$

9. An apparatus for continuously determining the time in which a strainer will develop a predetermined final pressure drop when subjected to a process stream containing a substantial amount of material that does not pass through said strainer, which comprises:

(a) said strainer, (b) means for sensing the pressure drop across said strainer, (c) means for reversing said strainer in said process stream whenever the pressure drop across said strainer reaches the predetermined final pressure drop, and (d) means for recording the number of reversals in a given time period whereby the time in which said strainer will develop a predetermined final pressure drop is determined.

10. An apparatus for continuously determining the time in which a strainer will develop a predetermined final pressure drop when subjected to a process stream containing a substantial amount of material that does not pass through said strainer, which comprises:

(a) said strainer,
(b) means for sensing the pressure drop across said strainer,
(c) means for reversing the direction of flow of said process stream through said strainer whenever the pressure drop across said strainer reaches the predetermined final pressure drop, and
(d) means for recording the number of reversals in a given time period whereby the time in which said strainer will develop a predetermined final pressure drop is determined.

References Cited

UNITED STATES PATENTS

| | | | |
|---|---|---|---|
| 2,572,436 | 10/1951 | Boucher et al. | 73—61.4 |
| 2,599,742 | 6/1952 | Boucher et al. | 73—61.4 |
| 3,138,552 | 6/1964 | Richards | 210—108 X |
| 3,157,131 | 11/1964 | Brydon | 210—108 X |

LOUIS R. PRINCE, Primary Examiner

JOSEPH W. ROSKOS, Assistant Examiner

U.S. Cl. X.R.

73—38; 210—106

PO-1050
(5/69)

UNITED STATES PATENT OFFICE
CERTIFICATE OF CORRECTION

Patent No. 3,455,146           Dated July 15, 1969

Inventor(s)  FRANK T. SMITH and ROBERT D. SMITH

It is certified that error appears in the above-identified patent and that said Letters Patent are hereby corrected as shown below:

Column 5, line 55 the formula should read as follows:

$$\frac{N_1 \cdot \ln\left(\frac{W_{01}}{W_1}\right) \cdot W_2 \cdot t_2}{W_1 \cdot t_1 \cdot \ln\left(\frac{W_{02}}{W_2}\right)}$$

Column 6, line 61 the formula should read as follows:

$$\frac{N_2 \cdot \left(1 - \sqrt{\frac{\triangle P_{04}}{\triangle P_4}}\right) \cdot W_3 \cdot t_3}{W_4 \cdot N_1 \cdot \left(1 - \sqrt{\frac{\triangle P_{03}}{\triangle P_3}}\right)}$$

SIGNED AND
SEALED
MAR 24 1970

(SEAL)
Attest:

Edward M. Fletcher, Jr.

Attesting Officer

WILLIAM E. SCHUYLER, JR.
Commissioner of Patents